(12) United States Patent
Shim et al.

(10) Patent No.: US 12,172,933 B2
(45) Date of Patent: Dec. 24, 2024

(54) METHOD TO PRODUCE A CERAMIC MATRIX COMPOSITE BY TAPE MELT INFILTRATION

(71) Applicant: Rolls-Royce High Temperature Composites Inc., Cypress, CA (US)

(72) Inventors: Sungbo Shim, Irvine, CA (US); Pathikumar Sellappan, Seal Beach, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 1067 days.

(21) Appl. No.: 17/070,148

(22) Filed: Oct. 14, 2020

(65) Prior Publication Data

US 2021/0114942 A1 Apr. 22, 2021

Related U.S. Application Data

(60) Provisional application No. 62/915,894, filed on Oct. 16, 2019.

(51) Int. Cl.
| | | |
|---|---|---|
| *C04B 37/00* | (2006.01) | |
| *C04B 41/00* | (2006.01) | |
| *C04B 41/45* | (2006.01) | |
| *C04B 41/50* | (2006.01) | |
| *C04B 41/87* | (2006.01) | |

(52) U.S. Cl.
CPC .......... *C04B 37/001* (2013.01); *C04B 41/009* (2013.01); *C04B 41/4523* (2013.01); *C04B 41/5096* (2013.01); *C04B 41/87* (2013.01); *C04B 2237/38* (2013.01); *C04B 2237/61* (2013.01)

(58) Field of Classification Search
CPC . C04B 37/001; C04B 41/009; C04B 41/5423; C04B 41/5096; C04B 41/87
See application file for complete search history.

(56) References Cited

U.S. PATENT DOCUMENTS

| | | | |
|---|---|---|---|
| 5,240,171 A * | 8/1993 | Newkirk | C04B 35/63416 228/198 |
| 6,820,334 B2 * | 11/2004 | Kebbede | B23P 6/005 29/889.1 |
| 7,695,582 B2 | 4/2010 | Stowell et al. | |
| 9,718,993 B2 | 8/2017 | Thorstensen et al. | |
| 11,186,525 B2 | 11/2021 | Shim et al. | |
| 2011/0288648 A1 * | 11/2011 | Joseph | C04B 37/006 623/18.11 |
| 2013/0167374 A1 * | 7/2013 | Kirby | H04W 4/023 428/317.9 |
| 2015/0115489 A1 * | 4/2015 | Corman | F01D 5/005 264/36.18 |
| 2016/0159066 A1 | 6/2016 | Landwehr et al. | |

FOREIGN PATENT DOCUMENTS

EP 1 035 089 B1 5/2003

* cited by examiner

*Primary Examiner* — Alex B Efta
(74) *Attorney, Agent, or Firm* — Shumaker & Sieffert, P.A.

(57) ABSTRACT

A method is provided in which a first tape is applied to an outer surface of a ceramic matrix composite (CMC). A second tape is applied to the first tape. The second tape is heated to at least a melting temperature of the second tape. During heating, the first tape is infiltrated with a molten material from the second tape, which forms a surface layer on the CMC.

9 Claims, 4 Drawing Sheets

METHOD TO PRODUCE A CERAMIC MATRIX COMPOSITE BY TAPE MELT INFILTRATION

CROSS-REFERENCE TO RELATED APPLICATIONS

This application is a non-provisional application of, and claims priority under 35 USC § 119(e) to, U.S. provisional application 62/915,894, filed Oct. 16, 2019, the entire contents of which are incorporated by reference.

TECHNICAL FIELD

This disclosure relates to fabrication of a ceramic matrix composite (CMC) and, in particular, to melt infiltration of the CMC.

BACKGROUND

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components. Accordingly, there is a need for inventive systems and methods including CMC materials described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, a method is provided in which a tape is applied to an outer surface of a ceramic matrix composite (CMC). The CMC and the tape are heated to a temperature that is at least a melting temperature of the tape. During heating, the CMC is infiltrated with a molten material from the tape, such that an infiltrated CMC is formed.

In another example, a method is provided in which a first tape is applied to an outer surface of a ceramic matrix composite (CMC). A second tape is applied to the first tape. The second tape is heated to at least a melting temperature of the second tape. During heating, the first tape is infiltrated with a molten material from the second tape, which forms a surface layer on the CMC.

Standard melt infiltration processes may involve introduction of molten silicon and/or a molten silicon alloy from one or two portions or cross sections of a ceramic matrix composite (CMC). In this method, a cross section of the CMC may be placed in a crucible or boat containing the molten silicon. The cross section of the CMC may be submerged in the molten silicon and/or molten silicon alloy. This method may be time consuming, inefficient and may not be suitable for CMC's with complex geometries. In some processes, melt infiltration may include infiltrating from the outer surface(s) of the CMC. However, it may be difficult to estimate an amount of silicon needed to infiltrate the CMC. Furthermore, surface melt infiltration may involve an additional cleaning process to remove excess silicon from the surface of the CMC.

One interesting feature of the systems and methods described below may be that a silicon tape may be applied to an outer surface of a CMC, and the silicon tape may be melt infiltrated into the CMC. Alternatively, or in addition, an interesting feature of the systems and methods described below may be that a SiC-based layer is applied to an outer surface of the CMC, the silicon tape is applied to the SiC-based layer, and the silicon tape is melt infiltrated into the SiC-based layer and the CMC.

FIGS. 1A-2B schematically illustrate a method for melt infiltration of a CMC with a tape 102 comprising silicon (Si), this method may be herein referred to as "tape infiltration." As used herein, the term "silicon" may refer broadly to the compound Si as well as to other silicon alloys, for example, silicon-boron alloys and/or boron-doped silicon. The tape 102 may also include other materials systems, such as Titanium and/or Tungsten based alloys.

Figure 1A:
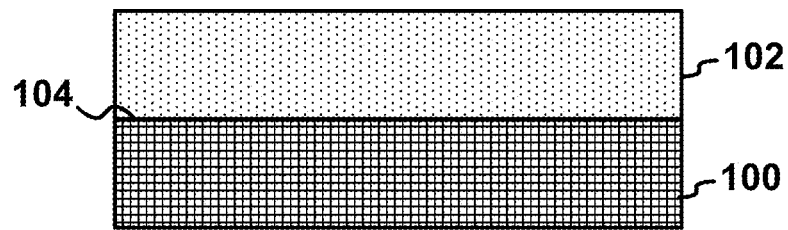
FIG. 1A schematically illustrates an example of a CMC, which includes a tape.

FIG. 1A illustrates a CMC 100, which includes a tape 102. The method includes applying the tape 102, which includes silicon, onto one or more outer surfaces 104 of the CMC.

The CMC 100, may be any structure that includes a framework of ceramic fibers and that is loaded with particulate matter as a result of prior slurry infiltration. The CMC 100 may also be referred to as an impregnated porous preform. In some examples, the CMC 100 may include a two- or three-dimensional weave of the ceramic fibers. In other examples, the CMC 100 may include a unidirectional tape. The CMC 100 may be formed by a slurry infiltration process that is carried out before the tape 102 is applied.

The ceramic fibers that serve as the framework for the CMC 100 may include SiC, or any other ceramic, such as silicon nitride, alumina, aluminosilicate, or carbon. As used herein, the term "silicon carbide" may refer broadly to the compound SiC as well as to other silicon-containing carbides. The particulate matter contained in the CMC 100 includes ceramic particles that become part of the ceramic matrix after tape infiltration. The ceramic particles may include SiC. Alternatively or in addition, the ceramic particles may include silicon nitride, alumina, aluminosilicate, boron carbide, and/or any another refractory carbide. In one example, the ceramic fibers comprise silicon carbide, and the ceramic particles (and ultimately the ceramic matrix) also comprise SiC. The ceramic matrix composite that is formed in such an example may be referred to as a silicon carbide/silicon carbide or SiC/SiC composite. The particulate solids used to form the resin coating on the surface of the CMC 100 may include the same or different ceramic particles as contained in the CMC 100. In some examples, the ceramic particles of the tape 102 may also include silicon carbide.

The CMC 100 may be formed by a slurry infiltration process prior to the application of the tape 102. Slurry infiltration may entail infiltrating a slurry composition comprising a solvent and the particulate matter into a porous preform comprising the framework of fibers, followed by drying in order to remove the solvent. Alternatively or in addition, reactive elements (for example, carbon) may be incorporated into the CMC 100 after slurry infiltration (but typically before application of the tape 102 on the surface) by infiltration with a resin or char-yielding polymer. Slurry infiltration may further be preceded by a chemical vapor infiltration process and by construction of the porous preform using fabrication traditional methods.

The tape 102 may be any composition applicable to a surface of the CMC 100 and configured infiltrate the CMC 100 upon application of heat. For example, the tape 102 may include silicon and silicon alloys. The tape 102 may be referred to as a silicon tape because the tape 102 may primarily include silicon, which may be or include a silicon alloy. The tape 102 primarily includes silicon if the largest component by weight of the tape 102 is silicon and/or a silicon alloy. Examples of metallic materials used in "tape infiltration" (and in the tape 102) include silicon and/or a silicon alloy, where the silicon alloy may include, for example, boron, tungsten, titanium, and/or tantalum. The tape 102 attached to the surface of the CMC 100 may comprise metallic particles and an organic binder. The tape 102 may further include a dispersant or a surfactant, the binder, and one or more plasticizers. The metallic and (optional) other particles included in the tape 102 typically have a width or diameter in a range from about 0.5 micron to about 45 microns. In one example, the tape 102 may be applied to at least a portion of the outer surface 104 of the CMC 100. Alternatively, the tape 102 may be applied to the entire outer surface 104 of the CMC 100. In another example, as further described with reference to FIGS. 2A-2B herein, the tape 102 may be applied to a SiC-based tape 200. The tape 102 may have a thickness between, for example, 50 to 500 microns.

In some examples, the tape 102 may be formed using a tape casting process, which converts silicon powder into a thin film, such as a tape. The tape casting may include forming a slurry, which includes a solvent and particulate solids. The particulate solids may be a powder comprising silicon, boron, titanium, molybdenum tungsten, or combinations thereof. The slurry may further include a plasticizer and/or a binder. The tape 102 may be prepared by tape casting a water-based slurry comprising the metallic particles, the optional other particles, an organic binder, a dispersant, a surfactant, and/or a plasticizer, and be casted onto a flexible polymeric sheet. Typically, the tape 102 has a solids loading of about 60-70 percent by volume. As indicated above, the thickness of the tape 102 may be in a range from 50 to 500 μm. After the slurry is casted into the tape 102, the tape 102 may be dried. After being casted and dried, the tape 102 may be cut into any desired shape. The tape casting process may further include determining a volume of porosity in the CMC 100 and determining an amount of reactive carbon in the CMC 100. A suitable amount of silicon needed to fill the volume of porosity in the CMC 100 may be determined, based on the porosity of the CMC 100 and the amount of reactive carbon in the CMC. In an example, the determined volume of porosity and amount of reactive carbon may be the porosity and reactive carbon in only a portion of the CMC 100. In another examples, the determined volume of porosity and amount of reactive carbon may be the porosity and reactive carbon in the entire CMC 100.

The tape 102 may be applied to the CMC 100 manually by positioning the tape on a desired surface of the CMC 100 and applying pressure. In some examples, multiple layers of the tape 102 may be applied to a portion of the CMC 100 based on a predetermine amount of silicon needed for infiltration. In some examples, an adhesive/binder may be applied to the outer surface 106 of the CMC 100 before application of the tape 102 in order to promote attachment of the tape 102. The adhesive/binder may be any compound configured to hold the tape 102 on the CMC 100. Typically, the adhesive comprises the organic binder used in the metallic tape 102.

Figure 1B:
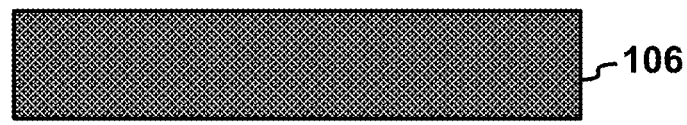
FIG. 1B schematically illustrates an example of a CMC component.

FIG. 1B schematically illustrates at least a portion of a CMC component 106 resulting from the tape infiltration of the tape 102 into the CMC 100. In an example, the method of tape infiltration described herein may result in a final CMC component 106 or infiltrated CMC, which may not include a surface layer at the surface of a CMC component/part 106, as all or substantially all of the molten silicon from the tape 102 infiltrates the CMC 100. Furthermore, upon tape infiltration with silicon or a silicon alloy, the carbon is converted to silicon carbide, and the silicon carbide already at the surface of the CMC 100 may help to prevent and/or limit any unreacted silicon from accessing the surface of the CMC component. The CMC component 106 may be any component or part of a gas turbine engine, such as a blade, vane, or casing.

After application of the tape 102, the CMC 100 may be tape infiltrated. During tape infiltration, the CMC 100 and the tape 102 are heated to a temperature that is at or above the melting temperature of the tape 102, for example, the temperature may be in a range of 1400° C. to 1500° C., for between 0.25 and 4 hours. The melting temperature of the tape 102 may be lower than that of pure silicon, for example, if the silicon in the tape 102 is a silicon alloy. The molten silicon from the tape 102 is drawn into capillaries, channels, and/or pores of the CMC 100 by capillary forces, which infiltrates the CMC 100. The molten silicon reacts with carbon and/or SiC present in the CMC 100. In some examples, from about 5 vol. % to about 15 vol. % of the final CMC component 106 may be unreacted silicon. It may be beneficial to reduce the amount of unreacted metal, such as silicon, in the final CMC component 106. This may be especially true at a surface of the final CMC component 106.

Figure 2A:
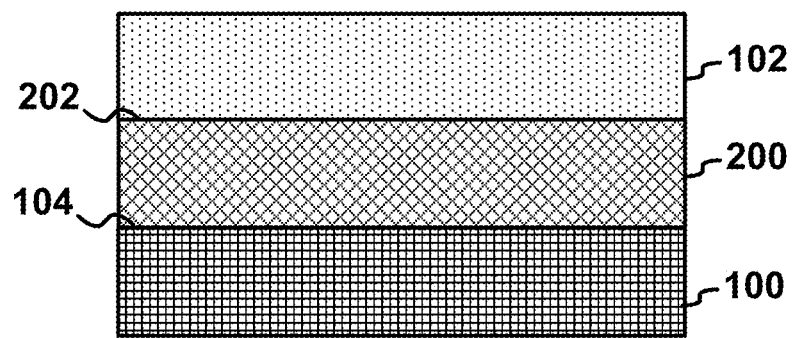
FIG. 2A schematically illustrates an example of a CMC, which includes a first tape and a second tape.

FIG. 2A schematically illustrates an example of the CMC 100 and the tape 102 which includes a SiC-based tape 200. In this example, the method includes applying the SiC-based tape 200, which includes silicon carbide, onto one or more outer surfaces 104 of the CMC 100 before application of the tape 102. The method further includes applying the tape 102, which includes silicon, onto one or more outer surfaces 202 of the SiC-based tape 200.

Figure 2B:
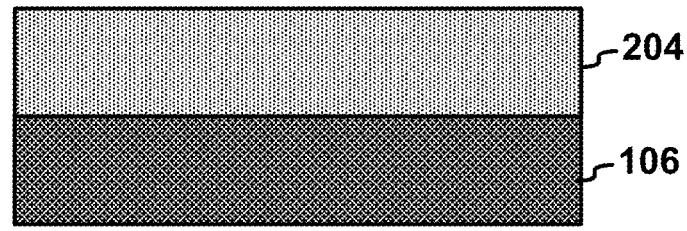
FIG. 2B schematically illustrates an example of a CMC component, which includes a surface layer.

FIG. 2B schematically illustrates an example of at least a portion of the CMC component 106 and a SiC-rich layer 204 resulting from the tape infiltration of the tape 102.

The SiC-based tape 200 may be any composition applicable to a surface of the CMC 100 and configured to receive at least a portion of the molten tape 102 during tape infiltration of the CMC 100. The SiC-based tape 200 may be produced by the tape casting process described herein in which the particulate solids of the slurry include SiC. The SiC-based tape 200 may be the same as the ceramic tape described in U.S. Non-provisional patent application Ser. No. 16/524,397 filed Jul. 29, 2019, entitled METHOD TO PRODUCE A PROTECTIVE SURFACE LAYER HAVING A PREDETERMINED TOPOGRAPHY ON A CERAMIC MATRIX COMPOSITE, which is hereby incorporated by reference. The SiC-based tape 200 may include ceramic particles and an organic binder. The SiC-based tape 200 may further include a dispersant or surfactant and optionally one or more plasticizers. The organic binder may comprise polyethylene glycol, an acrylate co-polymer, a latex co-polymer, and/or polyvinyl butyral, and the dispersant may comprise ammonium polyacrylate, polyvinyl butyral, a phosphate ester, polyethylene imine, and/or BYK® 110 (Byk USA, Wallingford, CT). The ceramic particles may comprise silicon carbide particles, silicon nitride particles, and/or silicon nitrocarbide particles; typically, the ceramic particles comprise silicon carbide particles.

The SiC-based tape 200 may be porous, such that during tape infiltration the tape 102 may melt through the SiC-based tape and into the CMC 100 during tape infiltration. The SiC-based tape 200 may further comprise reactive carbon. Upon tape infiltration, the tape 102 may infiltrate the SiC-based tape, and the silicon in the tape 102 may react with the carbon in the SiC-based tape 200. This method of tape infiltration may result in a final SiC-rich layer 204 at the surface of the final CMC component/part 106, as the molten silicon reacts with carbon in the SiC-based tape 200. Furthermore, upon tape infiltration with silicon or a silicon alloy, the carbon is converted to silicon carbide, and the silicon carbide already at the surface of the CMC 100 may help to prevent and/or limit any unreacted silicon from accessing the surface of the CMC component 106.

In some examples, at least 90 vol. % of the SiC-rich layer 204 may be silicon carbide and/or Silicon borides. Furthermore, less than 10% of the SiC-rich layer 204 may be unreacted (free) silicon. The SiC-rich layer 204 may have less than 2% residual porosity. The formation of SiC from the reaction of molten silicon with carbon during tape infiltration may be associated with a volume expansion of the SiC-based tape 200 of about 35%, which may help reduce porosity of the SiC-rich layer 204 and roughness of the outer surface of the SiC-rich layer 204. The SiC-rich layer 204 may have a thickness in a range of, for example, 50-250 microns.

After infiltration, the molten material may be cooled, and a ceramic matrix composite comprising the ceramic fibers embedded in a ceramic matrix is formed. During cooling, an optional flowing of nitrogen or ammonia may be performed to prevent and/or limit nodule formation on the final CMC component 106 and/or SiC-rich layer 204. The ceramic matrix is formed from the particulate matter in the preform as well as any ceramic reaction products created from the reaction between the molten material and the reactive element(s) in the CMC 100. The ceramic matrix may also include a residual amount of unreacted metal or alloy, typically silicon or a silicon alloy. The SiC-rich layer 204 may remain on the CMC or may be removed in whole or in part (for example, by machining and/or during development of Environmental Barrier Coatings (EBC's)).

In some examples, the CMC component 106 may refer to the combination of the CMC component 106 and the SiC-rich layer 204. In other examples the CMC component 106 may be any CMC body including a matrix reinforced with silicon carbide fibers, carbon fibers, alumina fibers, aluminosilicate fibers, and/or other ceramic fibers. The matrix (and thus the matrix material referred to above) may comprise silicon carbide, silicon nitride, silicon nitrocarbide, and/or other ceramic compounds. Typically, the fibers are silicon carbide fibers and the fiber preform is a silicon carbide fiber preform. A ceramic matrix composite that includes a matrix comprising silicon carbide and fibers comprising silicon carbide may be referred to as a silicon carbide/silicon carbide composite or SiC/SiC composite.

Figure 3:
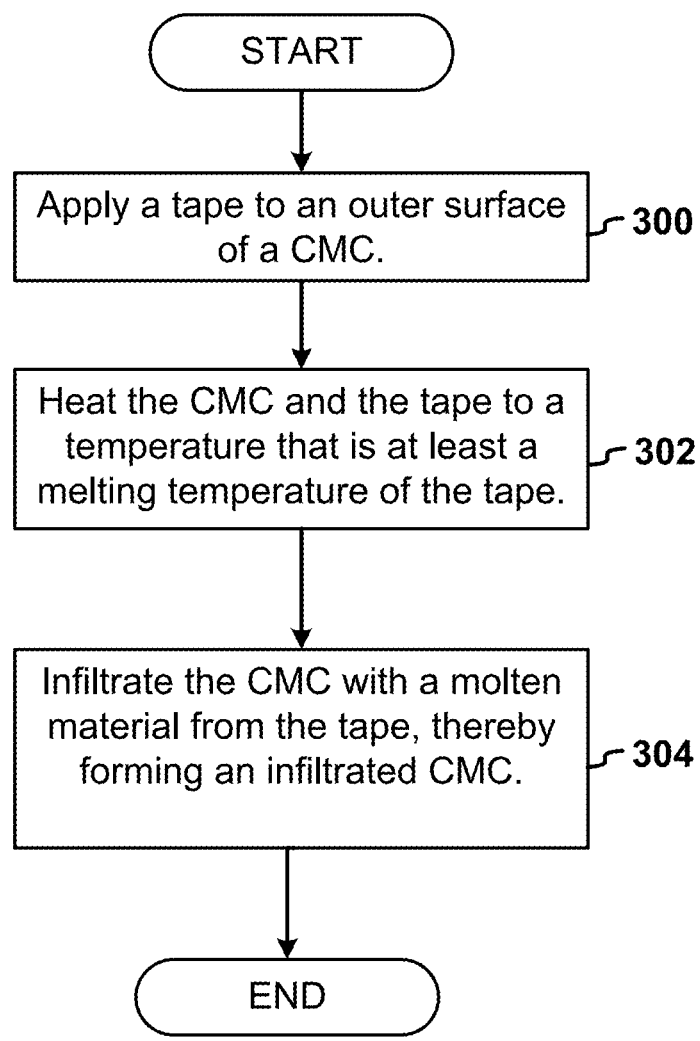
FIG. 3 illustrates a flow diagram of an example of a method of producing the CMC component of FIG. 1B.

FIG. 3 illustrates a flow diagram of an example of steps to tape infiltrate the CMC 100. The tape 102 is applied to the outer surface 104 of the ceramic matrix composite (CMC) 100 (300). The CMC and the tape are heated to a temperature that is at least a melting temperature of the tape (302). During heating, the CMC is infiltrated with a molten material from the tape, such that an infiltrated CMC is formed (304).

Figure 4:
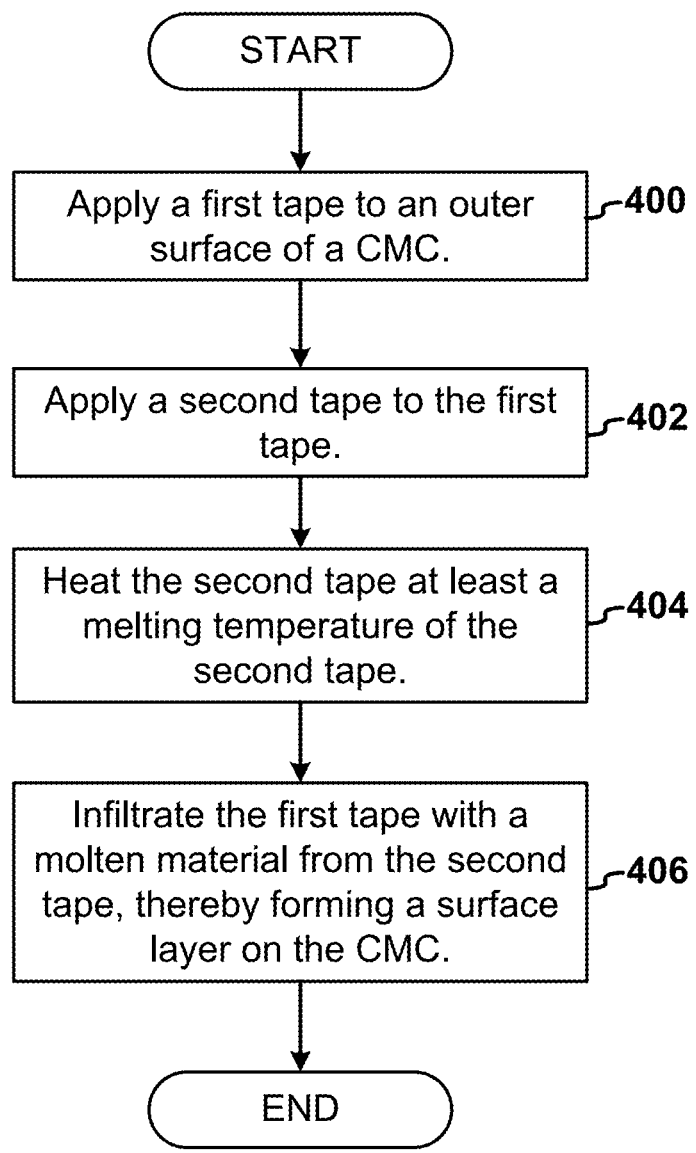
FIG. 4 illustrates a flow diagram of an example of a method of producing the CMC component of FIG. 2B.

FIG. 4 illustrates a flow diagram of an example of steps to produce the SiC-rich layer 204 on the CMC 100 and/or CMC component 106. A first tape, which is the SiC-based tape 200 as described herein, is applied to the outer surface 104 of the ceramic matrix composite (CMC) 100 (400). A second tape, which the tape 102 as described herein, is applied to the first tape (402). The second tape is heated to at least a melting temperature of the second tape (404). During heating, the first tape is infiltrated with a molten material from the second tape, which forms a surface layer on the CMC (406).

The steps may include additional, different, or fewer operations than illustrated in FIGS. 3 and 4. The steps may be executed in a different order than illustrated in FIGS. 3 and 4.

For example, the method of tape infiltration described herein may further include crucible and/or boat infiltration. Crucible melt infiltration includes a crucible, which holds molten silicon. The crucible may be any vessel configured to hold both the molten silicon and the CMC 100 to be infiltrated with the molten silicon. During crucible infiltration, a portion of the CMC 100, such as a cross section, is submerged in the molten silicon, and capillary forces cause infiltration of the submerged portion of the CMC 100. In some examples, tape infiltration may be used on more complex geometries of the CMC component 106, and crucible infiltration may be used on less complex geometries of the CMC component 106.

In some examples, the crucible infiltration may further include a carbon wick positioned in the crucible. The carbon wick may be any porous structure configured to hold the CMC 100 in position and assist in melt infiltration due to the porous nature of the wicking material of the carbon wick, which not only provides additional capillary forces, but also better contact with the CMC 100 and the molten material. The carbon wick also helps to remove and/or wick out excess/unreacted silicon from the CMC 100. Removal of excess silicon may help prevent and/or limit nodule formation on the CMC component 106 and/or the SiC-rich layer 204.

The method of fabrication of the CMC component may include other steps, such as laying up of plies to form a fiber preform having a predetermined shape, and/or application of a fiber interphase coating such as boron nitride to the fiber preform prior to rigidization. A rigidized fiber preform may be formed by applying a matrix material to the fiber preform during a chemical vapor infiltration (CVI) process. The rigidized fiber preform may be infiltrated with a slurry comprising silicon carbide particles in a liquid carrier into the SiC fiber preform. The slurry may further include reactive elements such as carbon that can react with the molten silicon or silicon alloy during melt infiltration, thereby reducing free silicon in the bulk of the CMC component.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method comprising: applying a tape to an outer surface of a ceramic matrix composite (CMC), wherein the tape comprises silicon; heating the CMC and the tape to a temperature that is at least a melting temperature of the tape; and during heating, infiltrating the CMC with a molten material from the tape, thereby forming an infiltrated CMC.

A second aspect relates to the method of aspect 1, further comprising determining a volume of porosity of the CMC, and determining an amount of the tape based on the volume of porosity.

A third aspect relates to the method of any of aspects 1 to 2, wherein the silicon is a silicon alloy.

A fourth aspect relates to the method of any of aspects 1 to 3, wherein the temperature is a melting temperature of the silicon included in the tape.

A fifth aspect relates to the method of any of aspects 1 to 4, wherein the tape comprises boron-doped silicon.

A sixth aspect relates to the method of any of aspects 1 to 5, wherein the applying the tape comprises applying a plurality of layers of the tape to the outer surface of the CMC.

A seventh aspect relates to the method of any of aspects 1 to 6, wherein the tape has a thickness between 50-500 microns.

A eight aspect relates to the method of any of aspects 1 to 7, further comprising positioning the CMC in a crucible, wherein the crucible also includes molten material, and wherein the molten material in the crucible also infiltrates the CMC.

A ninth aspect relates to the method of aspect 8, wherein the crucible includes a wick configured to remove an excess amount of the molten material from the CMC due to capillary forces resulting from a porous nature of a wick material of the wick.

A tenth aspect relates to the method of any of aspects 1 to 9, wherein the infiltrated CMC is at least a portion of a component for a gas turbine engine.

An eleventh aspect relates to a method comprising: applying a first tape to an outer surface of a ceramic matrix composite (CMC); applying a second tape to the first tape; heating the second tape to at least a melting temperature of the second tape; and during heating, infiltrating the first tape with a molten material from the second tape, thereby forming a surface layer on the CMC.

A twelfth aspect relates to the method of any of the preceding aspects, wherein the first tape includes a plurality of pores configured to conduct a flow of the molten material through the first tape and into the CMC, wherein the molten material infiltrates the CMC thereby forming an infiltrated CMC.

A thirteenth aspect relates to the method of any of the preceding aspects, wherein the infiltrated CMC includes 5% to 15% unreacted silicon by volume.

A fourteenth aspect relates to the method of any of the preceding aspects, wherein the infiltrated CMC is at least a portion of a component for a gas turbine engine.

A fifteenth aspect relates to the method of any of the preceding aspects, wherein the first tape comprises silicon carbide.

A sixteenth aspect relates to the method of any of the preceding aspects, wherein the second tape comprises primarily silicon.

A seventeenth aspect relates to the method of any of the preceding aspects, wherein the heating the second tape further comprises heating the second tape to a temperature in a range of 1400 to 1500° C.

An eighteenth aspect relates to the method of any of the preceding aspects, wherein the heating the second tape further comprises heating the second tape for 0.25 to 4 hours.

A nineteenth aspect relates to the method of any of the preceding aspects, wherein the surface layer includes a silicon carbide-rich layer.

A twentieth aspect relates to the method of any of the preceding aspects, further comprising applying a binder to the outer surface of the CMC before applying the first tape to the CMC.

In addition to the features mentioned in each of the independent aspects enumerated above, some examples may show, alone or in combination, the optional features mentioned in the dependent aspects and/or as disclosed in the description above and shown in the figures.

What is claimed is:

1. A method comprising:
    applying a tape to an outer surface of a slurry-infiltrated porous preform, wherein the tape comprises silicon;
    heating the porous preform and the tape to a temperature that is at least a melting temperature of the tape;
    during heating, infiltrating the porous preform with a molten material from the tape, thereby forming an infiltrated CMC; and
    positioning the porous preform in a crucible, wherein the crucible also includes molten material, and wherein the molten material in the crucible also infiltrates the porous preform.

2. The method of claim 1, further comprising determining a volume of porosity of the porous preform, and determining an amount of the tape based on the volume of porosity.

3. The method of claim 1, wherein the silicon is a silicon alloy.

4. The method of claim 1, wherein the temperature is a melting temperature of the silicon included in the tape.

5. The method of claim 1, wherein the tape comprises boron-doped silicon.

6. The method of claim 1, wherein the applying the tape comprises applying a plurality of layers of the tape to the outer surface of the porous preform.

7. The method of claim 1, wherein the tape has a thickness between 50-500 microns.

8. The method of claim 1, wherein the crucible includes a wick configured to remove an excess amount of the molten material from the porous preform due to capillary forces resulting from a porous nature of a wick material of the wick.

9. The method of claim 1, wherein the infiltrated CMC is at least a portion of a component for a gas turbine engine.

\* \* \* \* \*